United States Patent
Delp et al.

(10) Patent No.: US 8,370,635 B2
(45) Date of Patent: *Feb. 5, 2013

(54) SYNCHRONIZATION OF DIGITAL WATERMARKS

(75) Inventors: Edward J. Delp, West Lafayette, IN (US); Eugene T. Lin, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/951,843

(22) Filed: Nov. 22, 2010

(65) Prior Publication Data

US 2011/0123063 A1 May 26, 2011

Related U.S. Application Data

(60) Division of application No. 11/040,168, filed on Jan. 20, 2005, now Pat. No. 7,840,005, which is a continuation-in-part of application No. 10/349,322, filed on Jan. 21, 2003, now Pat. No. 7,886,151.

(60) Provisional application No. 60/538,069, filed on Jan. 20, 2004, provisional application No. 60/351,350, filed on Jan. 22, 2002.

(51) Int. Cl.
*H04L 9/32* (2006.01)

(52) U.S. Cl. .......... 713/176; 380/43; 380/201; 382/100; 382/190; 382/282

(58) Field of Classification Search .................. None
See application file for complete search history.

(56) References Cited

U.S. PATENT DOCUMENTS

| 6,785,401 | B2 * | 8/2004 | Walker et al. ................. 382/100 |
| 6,804,374 | B1 * | 10/2004 | Beattie et al. ................. 382/100 |
| 2002/0118831 | A1 * | 8/2002 | Rhoads .......................... 380/59 |
| 2002/0172394 | A1 * | 11/2002 | Venkatesan et al. .......... 382/100 |
| 2003/0112974 | A1 * | 6/2003 | Levy ............................ 380/210 |
| 2003/0133589 | A1 * | 7/2003 | Deguillaume et al. ........ 382/100 |

OTHER PUBLICATIONS

Swanson et al. "Multiresolution Scene-Based Video Watermarking Using Perceptual Models" IEEE, 1998, pp. 540-550.*
Holliman et al. "Robust frame-dependent Video Watermarking" SPIE, 2000, pp. 186-197.*

* cited by examiner

*Primary Examiner* — Shewaye Gelagay
(74) *Attorney, Agent, or Firm* — Digimarc Corporation

(57) ABSTRACT

A method for synchronization of a digital watermark generates a digital watermark based on feature extraction and a key generator. The synchronization method is adapted for both temporal and spatial synchronization. Statistical features of the watermarked signal along with key generators are used to compute keys used to detect embedded digital watermarks that vary over time or space. For spatial synchronization, spatial redundancy is used to detect geometric distortion of a signal in which the watermark is embedded using an autocorrelation method to detect peaks caused by the redundancy of the watermark structure. These peaks are then analyzed with a histogram method to detect rotation and scaling of the host media signal. The spatial synchronization process is applied to watermarks for both intra-coded frames of video (I-frames) as well as still images.

27 Claims, 11 Drawing Sheets

SYNCHRONIZATION OF DIGITAL WATERMARKS

RELATED APPLICATION DATA

This application is a division of U.S. application Ser. No. 11/040,168, filed Jan. 20, 2005 (now U.S. Pat. No. 7,840,005) which claims benefit of U.S. Provisional application 60/538,069, filed Jan. 20, 2004. Application Ser. No. 11/040,168 is also a continuation in part of U.S. application Ser. No. 10/349,322, filed Jan. 21, 2003 (US Patent Publication 2003-0221106), which claims the benefit of U.S. Provisional Application 60/351,350, filed Jan. 22, 2002. These applications are hereby incorporated by reference.

TECHNICAL FIELD

The invention relates to multimedia signal processing, digital watermarking, and synchronization in digital watermarking applications.

BACKGROUND AND SUMMARY

In related work published in U.S. Patent Publication 2003-0221106, we introduced a new paradigm for synchronization of media signals such as video and audio streams and applied it to digital watermark applications. In this document, we cover this synchronization paradigm and apply this paradigm to different forms of synchronization, including both temporal and spatial synchronization of digital watermarks. For spatial synchronization, we apply the paradigm in a spatial coordinate system of a media signal, such as the two-dimensional spatial coordinate system of a digital still image or frame of video. We have applied this paradigm to perform spatial synchronization of digital watermarks.

Digital watermarking systems typically have two primary components: an encoder that embeds a watermark in a host media signal, and a decoder that detects and reads the embedded watermark from a signal suspected of containing a watermark (a suspect signal). The encoder embeds a watermark by subtly altering the host media signal such that the watermark is imperceptible or nearly imperceptible to a human, yet automatically detectable with appropriate knowledge of the embedding function. The reading component analyzes a suspect signal to detect whether a watermark is present. In applications where the watermark encodes information, the reader extracts this information from the detected watermark. The embedding and reading functions employ parameters, typically referred to as a key or keys, which identify the attributes of the host signal that are changed to embed a watermark signal and that define how those attributes are to be interpreted to carry hidden message symbols.

The challenge of spatial synchronization in digital watermarking is to make the digital watermark robust to distortions of the spatial coordinate system of the signal in which it is embedded. Examples of spatial distortion include cropping and translation (shifting the position of the image and/or removing portions of the image), spatial scaling (e.g., magnifying or shrinking an image), rotation, shearing, etc. One way to accomplish synchronization is to embed the watermark into and extract the watermark from attributes of a host media signal that are sufficiently invariant to spatial distortions. Another way to accomplish synchronization is to detect and compensate for the spatial distortion to enable the digital watermark to be recovered. Features of the host signal and/or the watermark signal may be used to detect and compensate for distortion. These methods are not necessarily exclusive and can be used in combination. For example, features of the watermark may be used to detect and compensate for rotation and scaling. Then after compensating for rotation and scaling, variable message data may be decoded from the watermark in a domain of the signal that is robust to translation. Alternatively, other watermark features may be used to detect and compensate for translation before extracting the variable message data.

Several particular digital watermarking techniques have been developed. The reader is presumed to be familiar with the literature in this field. Particular techniques for embedding and detecting imperceptible watermarks in media signals are detailed in the assignee's U.S. Pat. Nos. 6,122,403 and 6,614,914, which are herein incorporated by reference.

A method for spatial synchronization of a digital watermark generates a digital watermark with spatial redundancy using a key generator, feature extraction, and redundancy control. The spatial redundancy is used to detect geometric distortion of a signal in which the watermark is embedded using an autocorrelation method to detect peaks caused by the redundancy of the watermark structure. These peaks are then analyzed with a histogram method to detect rotation and scaling of the host media signal. The spatial synchronization process is applied to watermarks for both intra-coded frames of video (I-frames) as well as still images.

Another method of synchronization of a digital watermark detector comprises receiving a host media signal in which a digital watermark is embedded, calculating a content feature from the host media signal, and using the content feature as a key to detect the digital watermark.

Yet another method for synchronization of a host media signal uses one or more programmed processors to perform acts of:

detecting redundant features in a host media signal;

computing geometric or temporal distortion of the host media signal from the redundant features;

synchronizing the host media signal using the estimates of the geometric or temporal distortion of the media signal;

extracting a feature value from the host media signal;

computing a watermark signal as a function of the feature value input to a state machine; and detecting the watermark signal in the synchronized host media signal.

Further features of the synchronization protocol will become apparent with reference to the following detailed description and accompanying drawings.

DETAILED DESCRIPTION

We provide an example of our synchronization protocol for watermarking. De-synchronization can occur due to channel distortion and malicious attack. Channel distortion refers to typical processing that occurs in a given application that has an adverse impact on synchronization. For example, in low bandwidth network connections among computers, the communication channel may give priority to certain data that shares the channel with the video. This may lead to loss of video frames (e.g., dropped packets) or changes in time scale. In addition, the transmitter or receiver of the video may lack processing power to transmit, receive or decode all of the data in time to deliver the video at a desired quality or frame rate, and thus, drop data and/or change the frame rate. Typical forms of signal transformations include lossy compression, digital to analog conversion, analog to digital conversion, re-sampling, time scaling, etc.

Malicious attack refers to processing intended to undermine the operation of the watermark. Some examples for video watermarking include frame deletion, insertion, transposition, lossy compression, averaging, etc.

Our protocol introduces some temporal redundancy to assist in temporal synchronization, yet uses temporal variation to improve security. The protocol is sufficiently general to enable the implementer to select the desired balance between security and computational complexity of the synchronizer. The protocol can vary the watermark over time by changing the watermark key, the embedding function or both. In the example below, the protocol varies the watermark key.

Figure 1:
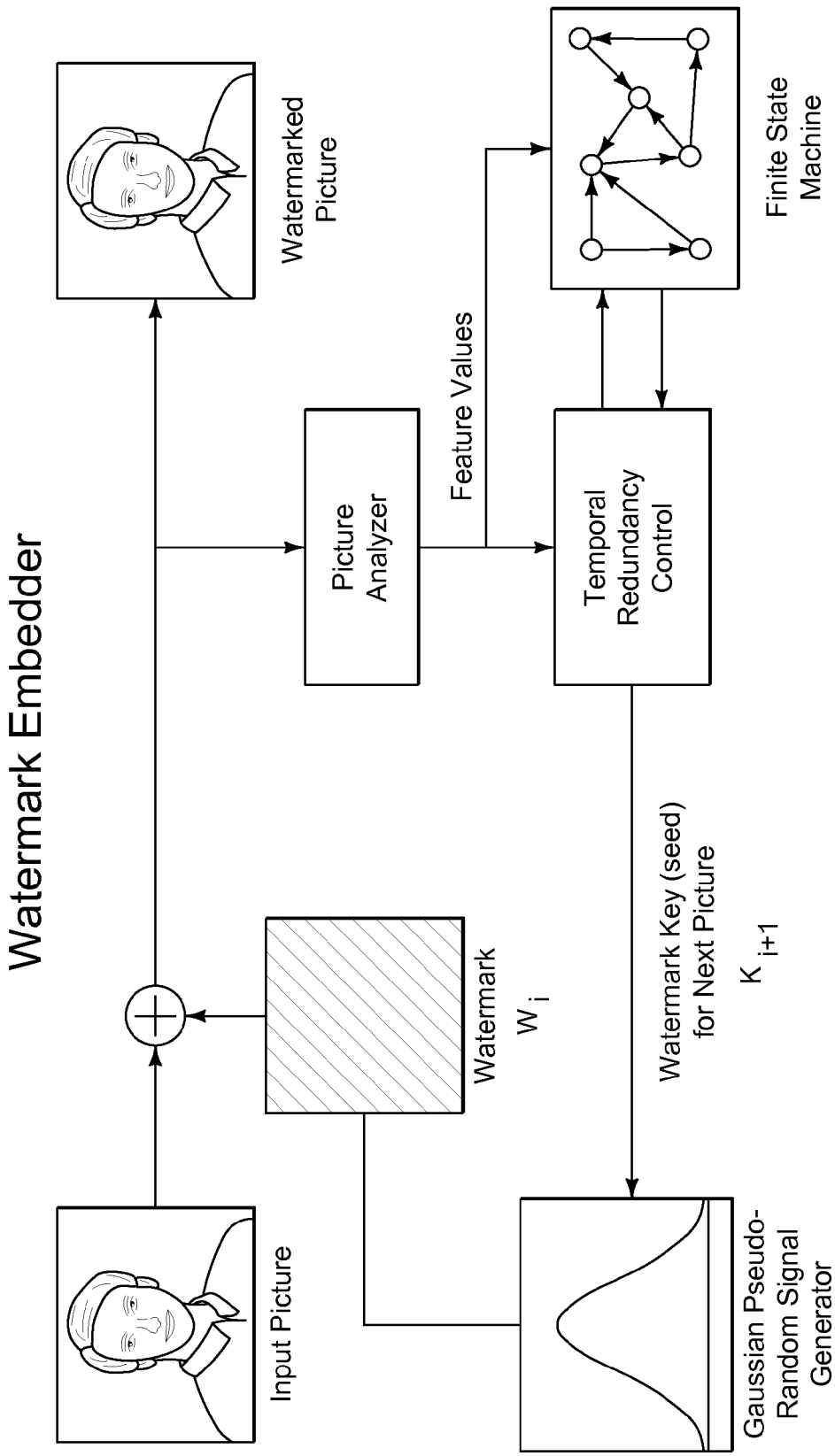
FIG. 1 illustrates an example of a synchronization protocol in a video watermark encoder.

To illustrate the protocol, FIG. 1 illustrates an example of the use of the protocol in the context of a video watermarking embedder. The synchronization protocol uses two primary parameters to control a sequence of watermark keys/embedding functions over time. The first parameter is the Period, which establishes the global redundancy of the protocol. In particular, it indicates the number of frames that are watermarked before resetting the protocol state. Our example implementation controls the state via a state machine and uses the state to vary the watermark key. It can also be used to vary the embedding function. For simplicity, we describe that the state machine output is used to index a watermark key in the remainder of the discussion. It may also be used to look up a corresponding embedding function.

The second parameter is called Repeat, which establishes the local redundancy within a Period. In particular, it defines the number of contiguous frames within the period that are embedded with the same watermark key and embedding function before changing the key.

The local redundancy allows the protocol to resist malicious attackers, and the global redundancy counteracts channel distortions. The global redundancy is also used where attacks exceed the capacity of the local redundancy to maintain synchronization.

In the protocol, an initial key is set either by the user, as a function of the host video signal, or a combination of both. One example is a pseudo-random (PN) sequence mapped to pixel or block locations within a frame. An example of a corresponding embedding function is one that computes a perceptual mask and adds scaled, antipodal elements of the sequence to selected elements in the spatial or frequency domain. The PN sequence may be generated by a seed derived from video features extracted from the frame. This is one example of a content dependent watermark key.

The encoder uses the initial key and associated embedding function to embed an initial watermark signal in an initial set of frames defined by the parameter, Repeat. While the particular example shown in FIG. 1 uses a spread spectrum spatial domain method for embedding the watermark, the synchronization protocol is agnostic to the specific type of embedding (and compatible) reading function used to hide the digital watermark in the video frames. In this example, the embedding function preferably employs a perceptual mask to scale the pseudo-random elements of the watermark signal before adding them to the host video frame. Other embedding functions may be used as well such as quantization techniques that quantize pixels, frequency coefficients or other signal features to levels or bins associated with a symbol element being encoded. For example, the key may be used to generate a PN sequence, whose elements are then mapped to features in the video frame. These features are then quantized to a level corresponding to the value of the element in the key.

The picture analyzer extracts features from each frame and inputs them to a finite state machine to get an index for the next watermark key. In our example implementation, the output of the analyzer is a set of feature vectors. In particular, the analyzer partitions blocks of pixels into groups based on an independent key. Alternatively, the analyzer can partition a frame based on segmentation of image objects as contemplated in MPEG-4 video.

For each partition, the analyzer computes a vector of feature values corresponding to the blocks in that partition. One example is:

$$\text{Feature } X = \text{Quantizer[meal (pixels in } X)]$$

In this example, the feature vector for partition X comprises the average of the luminance of the blocks, quantized appropriately to not be particularly sensitive to noise. Other examples include the average amount of motion between the frame and previous frame, and the variance of the Discrete Fourier Transform magnitudes of the frame. Preferably, the features are relatively simple to compute, and are sufficiently robust such that an attacker can only change the value of a feature by substantially degrading video quality. Other statistical features may be used as well.

Figure 3:
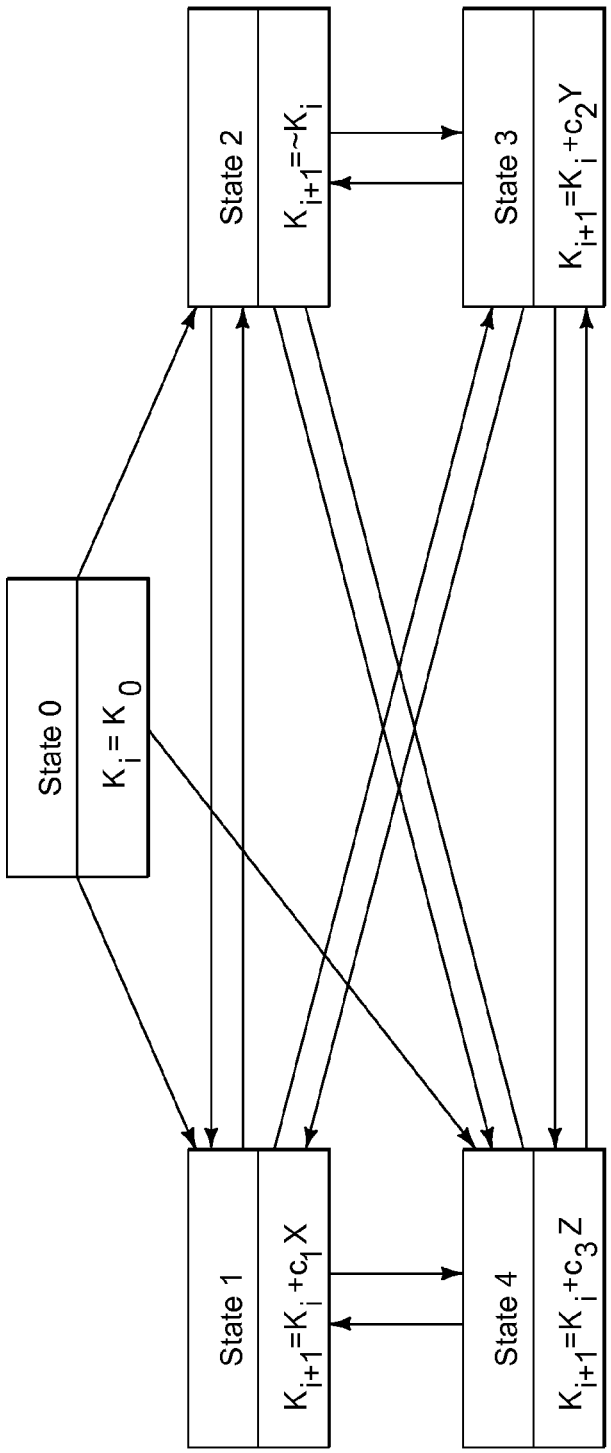
FIG. 3 illustrates an example of a state machine used to permute a key in the synchronization protocol of FIGS. 1 and 2.

The feature values are inputs to a state machine. Each state indicates how to permute the key from one state to the next. FIG. 3 illustrates an example of a state machine. X, Y, and Z are feature vectors and $c_i$ scales the feature vectors. In one implementation, an independent key is provided to further obscure or permute a next watermark in, e.g., State 1, 3 and/or 4. Such an independent key provides additional security for our inventive system. In another implementation, $c_i$ comprises a uniform random number between 0 and 1. In still another implementation, $c_i$ comprises a predetermined or random scalar. For each group of frames in the Period, the watermark encoder uses the initial key to embed an initial watermark and computes the features to derive the key to embed subsequent frames.

There are a number of possible variations to the scheme described above. The state machine key generator may be designed to generate a key:

1. Based on features of the host signal;
2. Based on randomization, such as random data input, function (e.g., cryptographic function in the state machine), or random function;
3. Based on features and randomization; or
4. Without features or randomization;

State transitions may be made adaptively to the characteristics of the host signal as opposed to limiting to every Repeat frames.

In the case where feature values are used, feature values can be selected using perceptually weighted functions or measures. One example is a visual hash. See, for example, J. Fridrich, "Visual hash for oblivious watermarking," Proceedings of the SPIE Security and Watermarking of Multimedia Contents II, vol. 3971, San Jose, Calif., Jan. 24-26, 2000, pp. 286-294.

Figure 2:
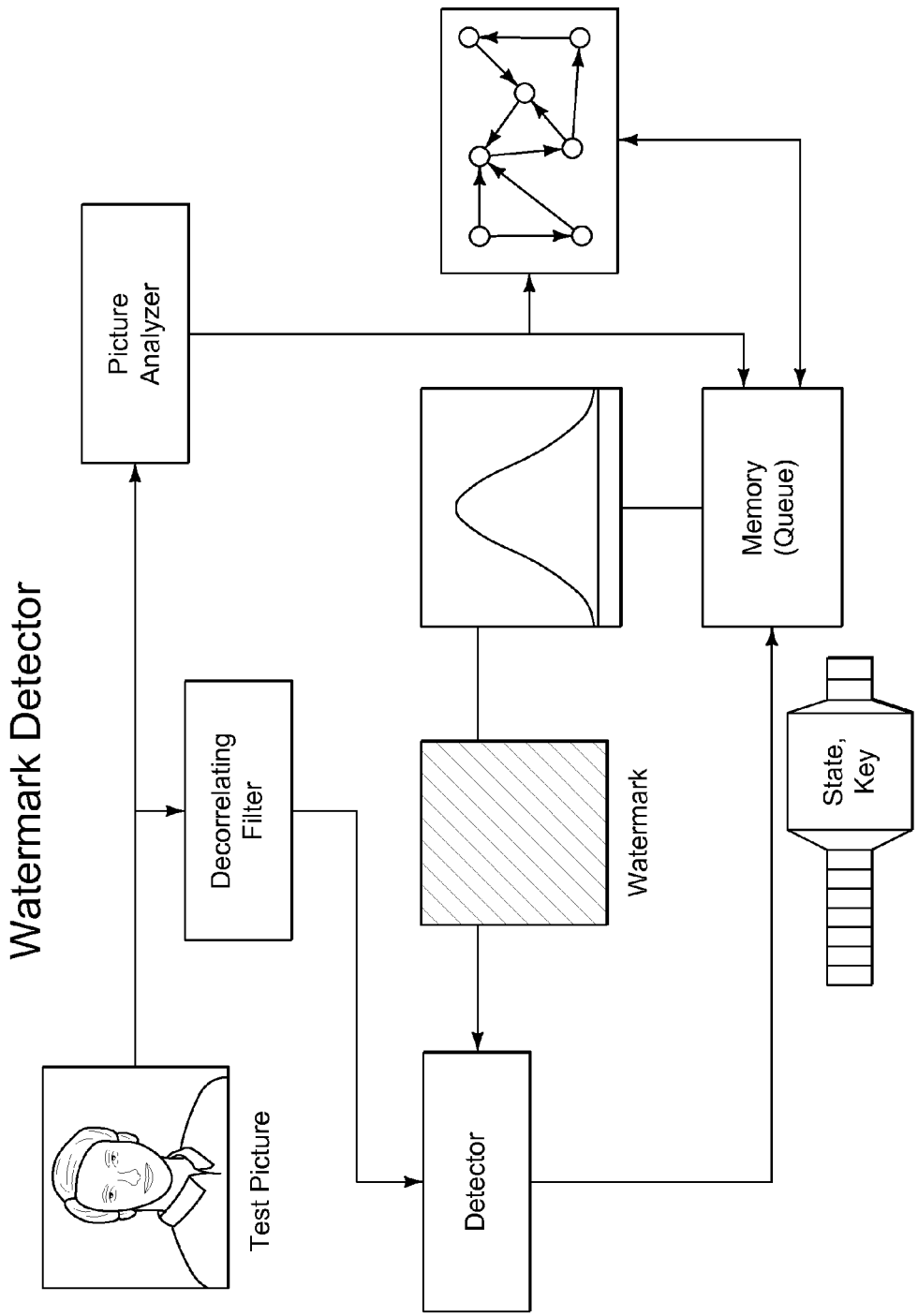
FIG. 2 illustrates an example of the synchronization protocol used in a watermark decoder compatible with the encoder of FIG. 1.

FIG. 2 illustrates a synchronizer for a watermark reader compatible with the encoder in FIG. 1. The synchronizer includes an analyzer and state machine compatible with their counterparts in the encoder. Optionally for some types of watermark reading functions, the suspect video signal may be pre-filtered using a de-correlating filter to de-correlate the watermark signal from the suspect signal.

To achieve initial synchronization, the synchronizer searches for an initial watermark using a known initial key and associated reading function. While many reading functions are applicable, one compatible reading function for our example comprises a linear correlator, which correlates the watermark signal based on the known key with the suspect video frames. This reading function is only one example, and any number of linear or non-linear reading functions compatible to the selected embedding function may be employed, including quantization based reading functions, statistical feature modulation functions, etc.

The synchronizer continues scanning frames until it detects the watermark embedded with the initial key and corresponding embedding function. After the synchronizer detects the watermark embedded with the initial key, the analyzer computes the feature values as in the encoder. The state machine stores the initial key and most recently detected watermark keys and corresponding synchronization states. The output of the state machine indexes the synchronizer to the key.

Using the indexed keys, the synchronizer checks every possible watermark indexed by the keys to find the one that produces the highest detection value (e.g., the highest correlation, the greatest number of correctly extracted known symbols or other detection metric). As described above, the state may be used to index both the key and reading function.

If the synchronizer finds a watermark, it moves the corresponding key and state to the top of its queue. It then inputs the features for the current frame into the state machine to find the next state and corresponding key (and reading function, if applicable).

A number of variations to the above system are possible. For example, the protocol may use multiple state machines, each with its own initial key, embedding/reading functions, feature dependencies and state. Preferably, the changes of the key from one frame to the next should be sensitive to the extent of the changes from one frame to the next. If the changes from one frame to the next are great, the amount of change to the key should take this into account to avoid wasted cycles trying to achieve synchronization.

The watermark embedding and reading methods may be designed to operate on compressed bit streams or uncompressed bit streams. Further, they can be designed to survive compression, and employ robust features that survive compression.

The synchronization protocol is applicable to other watermarking applications, other media types like audio, and non-watermark applications, like decoding of compressed bit streams. The synchronization protocol can use content features as the initial key, such as scene changes, scene cuts, wipes, fades, etc. The protocol achieves relative temporal synchronization at an arbitrary time point within a sequence of frames.

The pattern of key changes may be designed to convey payload information to the decoder. For example, different symbols may correspond to different patterns. By altering the video to adhere to these patterns in the encoder, the method can encode auxiliary data in the pattern of key changes.

Improving Security Variations in the State Machine for the Key Generator

To improve the security of the temporal synchronization method, the key schedule should preferably be difficult to deduce without knowledge of the watermark embedding key, even if portions of the sequence is observed by an attacker. Equivalently, the implementation should minimize the amount of information given to an attacker about future states if he observes present and past states. A number of enhancements to the state machine key generator can be made to improve security.

We will now describe a state machine that uses randomization to improve security. In general, randomization may be incorporated into the state machine by using randomized state machines or a state machine with random components. For the sake of illustrating a state machine with randomization, we use a state machine with a cryptographic hash function and random input for its state transition function. A hash function H takes arbitrarily sized (# of bits) input M and produces a message digest MD=H(M) of exactly size L bits. An example hash function is SHA-1, which produces a message digest of L=160 bits.

This state machine is described by the set of states, the state transition function, and the initial state. We establish the set of states to be the set of message digests, with each state corresponding to a unique digest. The cardinality of the state set is thus $|S|=2^L$, since there are $2^L$ possible bit combinations of a sequence of exactly L bits. We identify the initial state $S_0$ as the state with the same digest as the embedding key $S_0=K_E$. This implies that the embedding key space also has cardinality $2^L$. The state transition function is defined as:

$$\{NextStates\}=hash(K_E,State,Features,Random) \qquad (1)$$

where {NextStates} is the set of possible next states, $K_E$ is the embedding key, State is the current state, Features is the feature vector from the feature extractor, and Random is bits whose values are randomly determined during watermark embedding. The values of the random bits are not provided to the watermark detector, but because the watermark detector has a queue and is capable of performing a limited search, it will be possible for the detector to search the set of all possible next states if the number of random bits is small. If no random bits are used, then there will be exactly one possible next state for each given current state. If there are R random bits used, then there are $2^R$ combinations of those bits, and thus, there will be $2^R$ possible next states for each state. At the detector side, the detector adds all of the {NextStates} and their corresponding keys into the queue, since the detector is not sure which state the encoder might choose.

The key used for watermark embedding corresponding to each state is a subset of bits from the digest of the current state. It is possible that this subset of bits be key-dependent or state-dependent, or both. Let the function KT(MD) be the key transition function that takes a L-bit message digest and computes a N-bit key used for watermarking. The message digest may be used directly as a seed to a random number generator to compute the key. In this case, the function, KT, extracts a subset of N=32 bits from those L=160 bits for use as input to a random number generator that generates the watermark signal.

Another mode of operation to consider is to use all random bits and no feature vector bits. This mode of operation loses its advantage of being host signal-dependent, but has a couple of advantages of its own. Feature values are not used (or calculated), which saves computation time. This mode also allows the detector to be completely immune to any spatial attacks on watermarked video because there is no dependence on feature values.

In another enhancement, we can choose a randomly-determined initial state from a set of initial states, instead of beginning the state machine at $S_0$ every time.

This state machine has a number of potential advantages:

This state machine generates more states, which may make deducing the structure of the machine much more difficult.

This state machine has a key-dependent structure (because the state transitions depend on $K_E$ as well as the current state.) This means that the sequence of states that are used to create the watermarks for two different users (with different $K_E$'s) will not be identical, even if feature values are identical.

Even assuming that feature values are invariant (or are not used), adding randomness (in the form of the random bits) increases the uncertainty in the system. While this implies that the detector may need to have a larger queue to search all the possible next states, a degree of uncertainty helps increase the security of the system because it makes it more difficult for an attacker to predict the state and key sequences.

The use of the random function allows the state machine to treat all of the feature values "fairly", without (implicitly or explicitly) giving an importance to a particular feature value. Different elements of the feature vector can have different dynamic ranges without causing any need for scaling or normalization, since feature values in this scheme are not compared against each other. This also allows feature vectors of any length without having any special implementation issues, since the hash function works on an input of any number of bits. Feature vectors can even be different lengths for each frame.

Improving Robustness Against Temporal Attacks

To improve the robustness against temporal attacks, the implementer may use an adaptive algorithm to determine the state transitions based on the feature extractor, as opposed to a fixed repeat parameter for temporal redundancy control. Specifically, instead of changing the watermark at a fixed rate of every α (Repeat) frames, the system changes the watermark only after feature values remain constant for γ frames. This implies that there is now a connection between the feature extractor and the temporal redundancy control. This change does not require any modification to the watermark detector.

Another option is to perform feature analysis on every frame prior to watermark insertion, and change the watermark only when feature values change, and then, only after γ frames have been observed where the feature values do not change.

Improving Robustness Against Spatial Attacks

A potential vulnerability of the temporal synchronization method is that spatial attacks can potentially affect feature values. Once the feature values change, then the detector will no longer be able to produce the key schedule as the encoder and must wait until a resynchronization frame is encountered.

One method to increase the robustness against spatial attacks is to use features that provide a balance between robustness and variability over time. The features need to be robust such that they remain invariant relative to their original values after embedding of the watermark and after benign, content preserving manipulation of the content. Such types of benign manipulation that the features must survive are application dependent, and can include such processing as mild lossy compression, format conversion, etc. The features should remain invariant as long as the quality of the content is maintained above some desired quality level, such as a quality level measured by a human perceptual model (e.g., Just Noticeable Differences models, Watson visual quality metrics, quality models used in MPEG and/or JPEG coding of content, etc.). One potentially advantageous category of features is a set of features that is based on perceptually relevant features. Perceptually relevant features are features that are derived, at least in part, based on features that are relevant to the semantic meaning of the image or audio content to the viewer or listener. Such perceptual based features are invariant to changes in the content that are content preserving with respect to a perceptually quality metric. These features are computed using a perceptual function, including but limited to a visual hash, human perceptual model, etc.

In video, for example, we select features that are not too sensitive to the spatial domain pixel values because overly sensitive feature values may change in value over every frame and not yield any temporal redundancy. On the other hand, we want to select features that do change in time; otherwise, there would not be any point to using the features extraction. In other words, we select a function whose values, for a typical video sequence, are sensitive enough to change over the sequence but are not so sensitive that their values change with a slightest perturbation of the pixel values in the spatial domain.

Another method to increase robustness against spatial attacks is to not use features at all.

Example Implementation:

In the follow sections, we describe an example implementation.

1. Preliminaries and Definition of Symbols hash( . . . ) A cryptographically secure hash function that takes an arbitrarily sized input and produces a message digest of exactly L bits.

$K_E$ Master Embedding Key

K Embedding key for watermarking an individual frame. This key is of size N bits, which may be different than the size of $K_E$.

KT Key Transition function. In general, KT can depend on the current state, past state(s), and past key(s). This function takes its inputs and produces a N-bit watermark key.

$K_D$ Master Detection Key (which equals $K_E$)

In this example, we use SHA-1 as the cryptographic hash function, which produces a message digest of L=160 bits in length. This is, of course, an implementation parameter.

$K_E$ will be a 32-bit quantity. The size of $K_E$ is an implementation parameter.

K will be a 32-bit quantity (so N=32). The size of K is an implementation parameter that depends on the specific technique used to generate watermark signals for each frame. This length is chosen to be compatible with a Gaussian random number generator with a 32-bit internal state. If the watermark embedder uses more than 32 bits of state information, we can choose a larger value for the key length.

In our implementation, KT is a function that depends only on the current state and not directly on any past states or keys. (However, because past states, feature values, and random bits are used to determine the current state, KT does indirectly depend on those factors.) Because our KT is dependent only on the current state, and each state corresponds to a unique message digest produced by SHA-1, our KT will take as input a 160-bit value and output a subset of 32 bits.

There are many other possible choices for KT, such as using another hash function that produces a message digest of desired size.

2. Watermark Embedding Procedure (WEP)

The watermark embedding procedure uses a state machine that is defined using cryptographic hash functions, random starting states, and random bits in the state transitions. It is also possible to adapt the state transitions to the video characteristics, which increases robustness against temporal attacks.

Initialization

The initialization step is performed only once, after the embedding key $K_E$ is known. The goal of this step is to produce the set of {InitialStates} that will be used for starting the embedding process as well as for resynchronization frames.

There are two design parameters in this section: How many initial states to use, and how to generate the set of initial states.

How many states to use? The greater the number of initial states, the more difficult it may be for an attacker to try to deduce the state or key transitions by techniques such as analysis by Markov models. However, the larger the set of initial states, the more detections that the detector will have to perform because the detector must search the entire set of initial states for every frame.

Let NIS=Number of Initial States. This parameter may vary, but we choose a fixed, small constant (NIS=2).

How to Generate the Set of Initial States?

There are many ways which one can generate the set of initial states from $K_E$. In this example, we will generate the set of initial states by using the function:

$$\{\text{InitialStates}\} = \text{hash}(K_E, X) \quad (1)$$

where X is an integer that is varied from 1 ... NIS. Each value of X generates a unique state in the set of {InitialStates}.

Watermark Embedding: Main Loop

1. Set, the current state of the state machine, to a random member of {InitialStates}.
2. Compute K=KT(S), which is the corresponding key to state S.
3. Set a=0, b=0.
4. Read a frame of the input video.
5. Send the current key K to the watermark embedder to watermark the current frame.
6. Increment a by 1. If a<α (Period), continue to the next step. Otherwise, go to step 1.
7. This step depends on whether adaptive state transitions are used or not:
    If adaptive state transitions are not used:
    a. Increment b by 1.
    b. If b<β (Repeat), go to step 4. Otherwise, set b=0 and continue to step c.
    c. Run the feature analyzer on the current, watermarked frame to obtain the feature values. Let F be the feature vector output from the feature analyzer. Continue to step 8.
    If adaptive state transitions are used:
    a. Run the feature analyzer on the current, watermarked frame to obtain the feature values for the current frame. Let F be the feature vector output from the feature analyzer.
    b. Compare F, the current feature values, with LF, the feature values obtained from the previous frame. If F≠LF, then set LF=F and b=1. Otherwise, increment b by 1.
    c. If b<γ, go to step 4. Otherwise, set b=0 and continue to step 8.
8. Generate RN, an R-bit random number.
9. Obtain the next state by computing NextState=hash($K_E$, S, F, RN).
10. Obtain the next key by computing NextKey=KT(NextState).
11. Set S=NextState, K=NextKey, and continue to step 1.

Parameters for the main loop include:
   The cryptographic hash function used for the state transitions.
   The key transition function KT, used to obtain the next key.
   Whether adaptive state transitions is used.
   The period parameter α.
   The repeat parameter β if adaptive transitions are not used, or
   The number of frames that must have the same feature value prior to a state transition γ, if adaptive state transitions are used.
   The feature analysis.
   R, the number of random bits used for determining the next state. Because the necessary number of elements in the queue of the detector grows exponentially as R increases, R is typically a small value (such as 0, 1, 2, or 3.) If R is zero (no random bits used), there will always be a unique next state for a given current state and feature values.

3. Watermark Detection Protocol (WDP)

Initialization

The watermark detector needs to know the set of {InitialStates}, so the initialization for the detector is identical to the initialization for the embedder (see Section on Initialization in sub-section 2). In addition, the detector also obtains the set of {InitialKeys} which correspond to computing KT(S) for each state S in the set {InitialStates}.

The detection queue starts out empty.

Watermark Detection: Main Loop

1. Read a frame of the video.
2. Attempt to detect the watermark by using:
    a. Every key stored in the queue.
    b. Every key in the set {InitialKeys}.
3. If no watermark was found during step 1, go back to step 1 to try and detect a watermark in the next frame.
4. If the watermark found during step 1 does not correspond to one of the keys in the set of {InitialKeys}, that key must be present in the queue. Move that (State,Key) pair to the head of the queue.
    Otherwise, the detected watermark must be a member of the set of {InitialKeys}. Set the current state to the member of {InitialStates} that corresponds to the member of {InitialKeys} that was detected.

5. Perform feature extraction on the watermarked image, to obtain F, the feature values.
6. Compute the set of {NextStates}=hash($K_D$, State, F, RN) for every possible combination of random bits RN. If random bits are not used by the embedder, then there will only be one state in the set of {NextStates}.
7. For each state in {NextStates}, find its corresponding key using K=KT(NextState) and add that (State,Key) pair into the queue. Because the queue is of finite size, this operation can cause one or more entries at the tail of the queue to be lost.
8. Continue in step 1.

Implementation Parameters:

The queue size (number of entries in the queue).

Spatial Synchronization

This section describes a scheme for spatial synchronization for a digital watermarking system. The system includes an embedder and a detector. The embedder facilitates spatial synchronization by introducing spatial redundancy in the digital watermark. The detector exploits that redundancy to detect and compensate for spatial distortion, including rotation and spatial scaling.

To generate a watermark with spatial redundancy, our scheme for spatial synchronization adapts the method of using the key generator, feature extraction, and redundancy control in the synchronization paradigm above to the spatial domain. The spatial synchronization process can be applied to watermarks for both intra-coded frames of video (I-frames) as well as still images.

Watermark Structure

One method to apply the temporal synchronization method to the spatial domain is to embed the watermark over a pattern of non-overlapping blocks of the spatial domain. There are many different possible patterns. To implement and test the method, we chose a structure that organizes the watermark in macroblocks and blocks.

Figure 4:
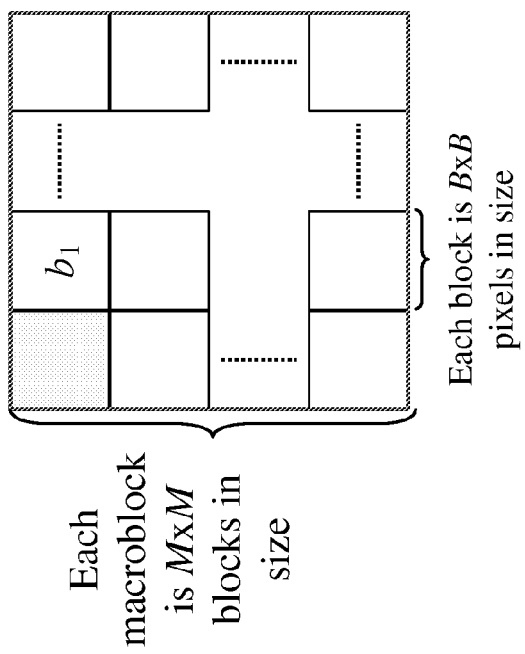
FIG. 4 is a diagram illustrating an example of a watermark structure used to introduce spatial redundancy used for spatial synchronization of a digital watermark.

In this implementation, the watermark is created on a macroblock-by-macroblock basis. Each macroblock consists of a region M blocks horizontally by M blocks vertically and each block is an area B pixels wide by B pixels tall in size. Thus, there are $M^2$ blocks per macroblock, denoted $b_0, b_1, \ldots, b_{M^2-1}$, and each macroblock corresponds to an area of (BM) pixels wide and (BM) pixels tall. The macroblock structure is shown in FIG. 4.

Figure 5:
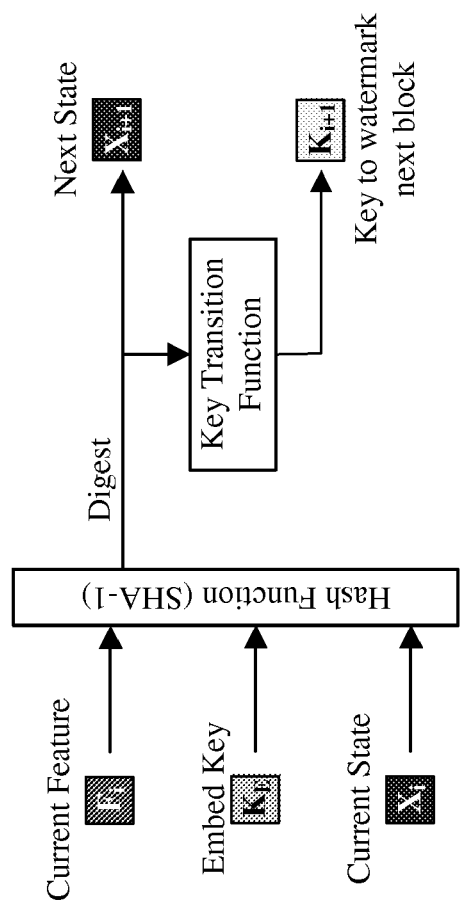
FIG. 5 is a diagram illustrating a method for generating a watermark structure.

FIG. 5 is a diagram illustrating a method for generating a watermark structure. Before the first block ($b_0$) of the watermark is generated, the key generator is reset to a known initial state. Then, the watermark signal for the block is produced and inserted into the original image. Then, the feature value is obtained using the current (watermarked) block, and the next state and key are produced with the current state, feature value, and embedding key $K_E$ as shown in FIG. 5. This process is repeated until the watermark has been produced for the entire macroblock, and then for all the macroblocks to fill the same area as the image to be watermarked. Boundary regions may cause problems for watermark generation because the watermark is dependent upon the order that the watermark blocks are generated within a macroblock.

Figure 6:
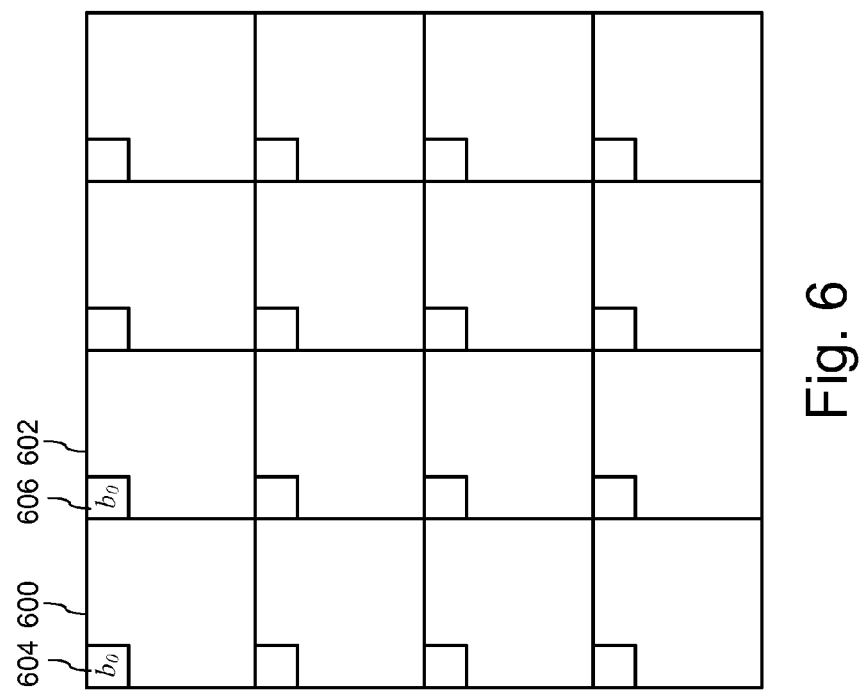
FIG. 6 is an example illustrating a watermark structure with redundancy for spatial synchronization.

The procedure produces a watermark structure shown in FIG. 6. Macroblocks (e.g., 600, 602, etc.) are tiled contiguously across the image. The first block ($b_0$) (e.g., labeled as 604, 606) for each macroblock is produced using a known initial state of the key generator and is not dependent on feature values, so it is identical for all macroblocks. These blocks are called synchronization blocks since they play a central role in the synchronization procedure. The keys used to produce the watermark for all other blocks will depend on the feature values obtained from the watermarked image, and in general will not be identical. Of course, if the macroblock size is M=1, then each macroblock will consist of only the synchronization block and the entire watermark will possess a purely tiled structure.

We define the ratio of the number of synchronization blocks to the total number of blocks in a single macroblock as $\lambda$. For the watermark described above, $\lambda=1/(M^2)$.

Spatial Synchronization Procedure

The synchronization blocks produce a periodic structure in the watermark that can be detected using (two-dimensional) auto-correlation. Specifically, the auto-correlation of a periodic signal has a large central peak (corresponding to zero lag) and peaks at lags corresponding to integral multiples of the period. In our watermark implementation, the synchronization blocks provide the periodicity. By examining the locations of the peaks, the orientation and scale of the watermark in the watermarked image or video frame can be estimated.

Figure 7:
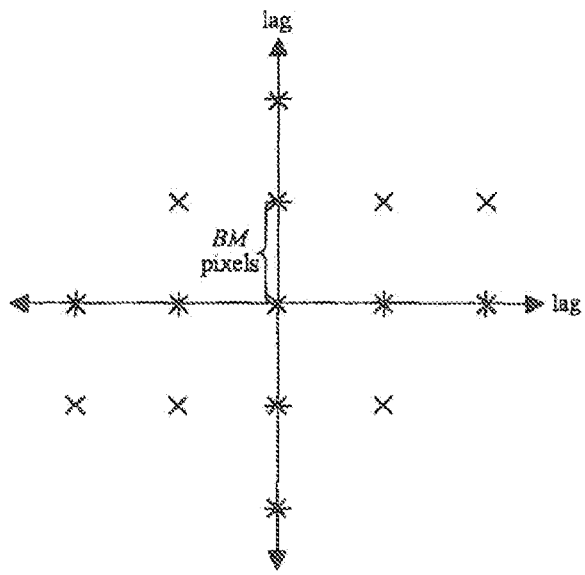
FIG. 7 shows an expected pattern of peaks in the autocorrelation domain for a watermarked image without geometric distortion.

FIG. 7 shows the expected pattern of peaks in the auto-correlation for a watermarked image that has not been attacked. The two-dimensional auto-correlation is symmetric with respect to the origin, and thus the pattern of peaks will be symmetric with respect to the origin. The spacing between auto-correlation peaks will be BM pixels/lags because the synchronization blocks are tiled on a per-macroblock basis.

Figure 8:
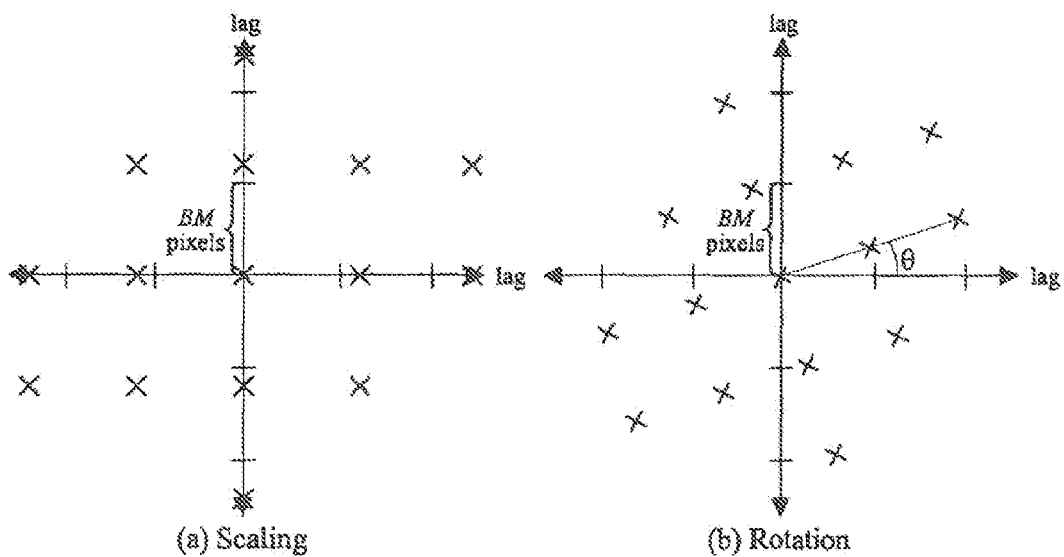
FIG. 8 shows the pattern of peaks in the autocorrelation domain for watermarked images that have been scaled or rotated.

FIG. 8 shows the pattern of peaks for watermark images that have been re-scaled and rotated. For a re-scaled watermarked image, the peaks should still occur in a regular, grid-like fashion but the peaks will be spaced at intervals other than BM pixels/lags. For uniform scaling, the scale factor can be determined as the ratio between the actual peak spacing to BM. FIG. 8 also shows the effect on the auto-correlation if a watermark image undergoes spatial rotation by angle θ: the position of the peaks are also rotated by θ.

Synchronization by using the auto-correlation as described here has some challenges: First, the auto-correlation function does not provide information regarding the spatial shift (translation) that may have been applied to the image. This can be addressed by embedding/detecting a watermark in a domain that is invariant to translation (e.g., Fourier magnitude domain), or using a method for spatial translation synchronization that detects and compensates for translation (e.g., detecting shifts by cross correlation with a watermark pattern). Second, the symmetry of the peak pattern may cause difficulties in obtaining a precise estimate of the rotation angle. For example, rotating the peaks by the angles θ, θ+90°, θ+180°, and θ+270° result in indistinguishable patterns. The symmetry may also manifest as problems distinguishing θ+30° and θ+60°, or θ and θ+45°. This can be addressed by using a pattern of peaks with less symmetry, using a watermark that is invariant to different rotational states, and/or using additional watermark features that distinguish between the rotational states after some likely candidates for the rotation are identified in the auto-correlation domain.

Watermark Embedder

The watermark embedder constructs the watermark signal on a block-by-block basis as described in the previous section. For each block, the current watermark key is provided to a Gaussian-distributed pseudo-random number generator to produce a zero-mean unit variance watermark signal for the block. The watermark signal is scaled by the watermark embedding strength parameter σ and then inserted into the original image by addition to the spatial pixel values. For color RGB images, the image is converted to YUV colorspace and only the luminance (Y) component is watermarked. The key used for generating the watermark in synchronization blocks is a known embedding key $K_E$. For all other blocks, the watermark key is generated as shown in FIG. 5, where the feature $F_i$ is a randomly generated 32-bit value. This virtually ensures that the watermark keys for all non-synchronization blocks will be distinct, and hence the watermark signals of non-synchronization blocks will be uncorrelated and not contribute significantly to the auto-correlation. The degree of correlation among non-synchronization blocks will vary as the watermark is made dependent on features of the host image.

Watermark Detector

Figures 9, 10:
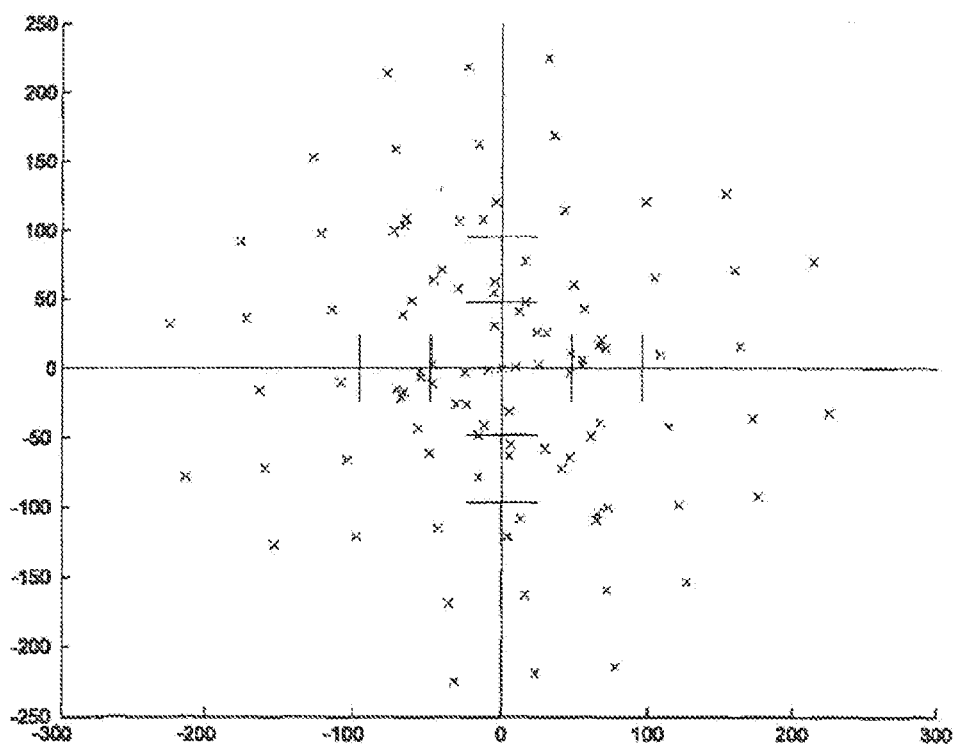
FIG. 9 is a diagram of a filter used to preprocess an image for watermark detection.
FIG. 10 is a pattern of peaks in the autocorrelation domain of a geometrically distorted image.

In this section, we describe an implementation of our watermark detector software. The procedure for watermark detection is as follows:

1. High-pass filter the test image. This de-correlating filter reduces the effect of low-frequency components of the host image on the detection. The Finite Impulse Response (FIR) filter has the kernel shown in FIG. 9, with the center element corresponding to the filter center.

Initial experiments show that this step is useful in facilitating detection of auto-correlation peaks.

2. Calculate the auto-correlation of the filtered image.

3. Find the locations of the peaks in the auto-correlation domain, producing a list of peaks. The current implementation of the peak finding algorithm is described below.

4. Truncate the peak list to P' peaks. This is performed by sorting the list of peaks in descending order (by the magnitude of each peak) and retaining the top P' peaks. Because of the properties of the auto-correlation function, this will usually retain the peaks closest to the center.

5. Using the peak list, estimate the rotation and scale of the watermark. Our proposed peak analysis technique is described below.

6. "Reverse" the rotation and normalize the scale of the watermark.

7. Watermark signal detection.

Peak Finding

In our test implementation, we used the following peak finding algorithm: A 7×7 window is swept across the image auto-correlation and the value of the center element is compared with the values of all other elements in the window. If the center value is equal to or larger than all other elements in the window, then a peak is indicated at the center location.

The test results show that the technique performs best for macroblock sizes of M=1, 2, or 3 blocks. To observe a significant pattern of peaks for the case where M=4 blocks, the embedding strength should be increased and the block size reduced. This suggests that it is a challenge to have enough periodicity for the auto-correlation to reliably determine the watermark orientation when the watermark construction has $\lambda \leq (1/9)$. Also, $\lambda = (1/9)$ may be insufficient for low embedding strengths ($\sigma = 2.0$).

Generally, increasing the block size decreases the effectiveness of the auto-correlation for our test image. At all macroblock sizes and embedding strengths, larger block sizes seem to cause the appearance of extraneous peaks in the auto-correlation, which may make estimating the watermark orientation and scale from the peaks more challenging.

Increasing the embedding strength (the watermark signal power) improves the detectability of the pattern of auto-correlation peaks (i.e. the template). The peak patterns appear better for fixed B, M as the embedding strength is increased.

The periodicity in the watermark decreases as the macroblock size is increased. One way to address this problem is to allow more blocks within a macroblock to be fixed (and thus, identical in all macroblocks), not just the first block of the macroblock. This could be performed by ignoring the feature values for the first m blocks within a macroblock. The current method of watermark construction forces $\lambda$ to be $1/(M^2)$, where a revised embedder would allow the ratio to be $\lambda = m/(M^2)$, $1 \leq m < M^2$.

Peak Analysis

After performing steps 1-4 as described in the section entitled Watermark Detector, the detector obtains a list of peaks with P' entries. The peak list contains the location $(x_i, y_i)$ and the magnitude $m_i$ of each peak. These section describes a method for estimating the watermark rotation and scale (step 5 of watermark detection) from a pattern of peaks. Ideally, the peaks should appear similar to FIG. 7 (no attack) or FIG. 8 (synchronization attack). Thus, the objective of the peak analyzer is to detect the grid-like pattern of peaks in the auto-correlation domain, where the peaks may be rotated by some unknown $\theta$ and the spacing z between the peaks is also unknown.

To illustrate the method, we describe it for an example image. For the example image, the watermark is embedded using B=16, M=3, and embedding strength of $\sigma=5.0$. The watermarked image is attacked as follows: First the image is re-scaled to 115% of the original size, and then the image is rotated 6 degrees. Both operations were performed by Matlab using bicubic interpolation. Each macroblock in the attacked image is of size (16 pixels/block)#(3 blocks/macroblock)#(1.15 from the scaling attack)=55.2 pixels, or rounded to 55 pixels, which is the actual distance between the peak location in the auto-correlation shown in FIG. 10.

Peak Pre-Processing

Thus far, the construction of the peak list takes into account the magnitude of the peaks but not the fact that the auto-correlation function is symmetric with respect to the origin. Approximately half of the peaks in the auto-correlation are simply redundant. The first step is to remove all peaks in the peak list that appear in the left-hand half-plane (that is, all peaks with coordinates $x_i < 0$ are removed from the list). After the removal of these peaks, assume that P peaks remain in the peak list, $P \leq P'$.

Obtain Distance and Angles Between Every Pair of Peaks

Figure 11:
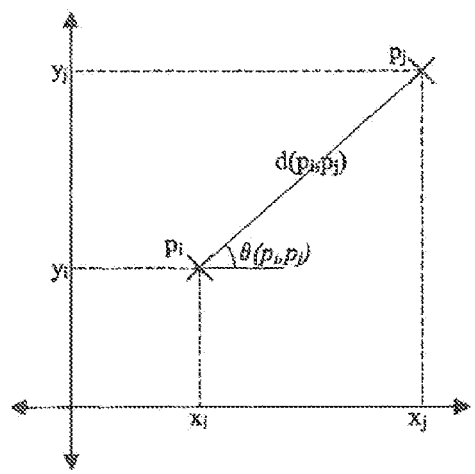
FIG. 11 illustrates a measure of a distance between peaks.

The next step is to obtain the distance and angle between all pairs of peaks $p_i$ and $p_j$. The distance and angle are the standard Euclidean FIG. 11:

$$d_{ij} = d(p_i, p_j) = \sqrt{(x_i - x_j)^2 + (y_i - y_j)^2} \quad (2)$$

$$\theta_{ij} = \theta(p_i, p_j) = \tan^{-1}\left(\frac{y_i - y_j}{x_i - x_j}\right) \quad (3)$$

There are $P(P-1)/2$ pairs for a set of P peaks, and this computation is not expensive compared with auto-correlation.

Construct Distance Histogram

The next step is to construct a histogram of pair-wise distance values. Once constructed, the histogram will show the distribution of the distance measures $d_{ij}$. The first bin in the distance histogram corresponds to distances in the interval [0.0,0.5). The second bin corresponds to the interval [0.5,1.5), the third bin [1.5,2.5), and so on. There are a total of D+1 bins in the histogram, where D is the largest distance between any two peaks (rounded to the nearest integer) and the "+1" term reflects the first bin. Thus, the bin index corresponds to a distance rounded to the nearest integer, and the bin count is a tally of how often that distance occurs amongst all pairs of peaks.

Figure 12:
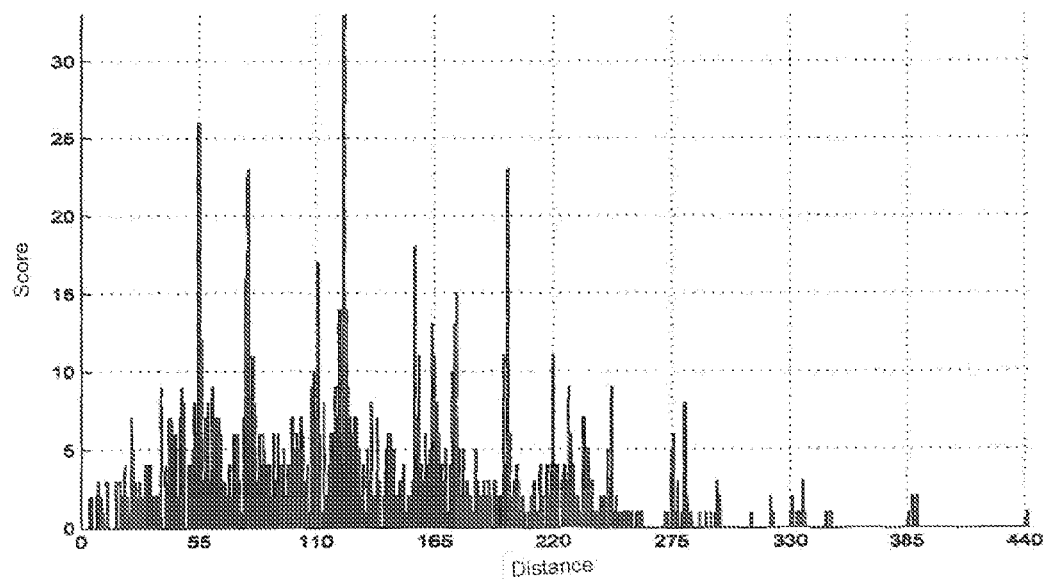
FIG. 12 illustrates a pairwise distance histogram of a geometrically distorted image.

FIG. 12 shows the distance histogram of the attacked image. The grid lines correspond to integral sizes of a macroblock in the attacked image (i.e. every 55 bins). There is a tall peak at the bin corresponding to a distance of 55 pixels, but it is not the tallest peak in the histogram, which occurs at the bin corresponding to 123 pixels. During the next step, a scoring function is used in conjunction with the distance histogram to estimate the scale of the embedded watermark.

Estimate Watermark Scale

The distance histogram of FIG. 12 shows that while the expected distance between the peaks occurs frequently in the distance histogram, it is not necessarily the most frequently occurring distance observed. We can obtain a better estimate of the watermark scale by taking into account the geometric properties of a grid of points representing the peak locations.

Figure 13:
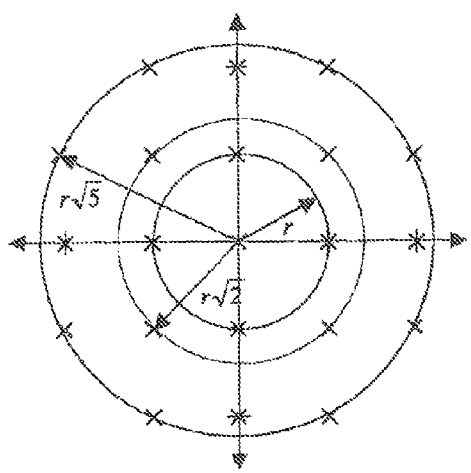
FIG. 13 illustrates another measure of distances in a grid of points.

Consider the grid of points shown in FIG. 13, where the nearest neighboring points are separated by an unknown distance r. If one considers only the distances between the points, there are exactly four neighboring points located r units away from the center. If one were to examine the tallest peaks in the distance histogram, these are the only four points that would be considered in such an analysis. However, the pattern structure also provides four points that are at a distance of $r\sqrt{2}$ from the center (those points are located on the green circle), four points at a distance of 2r (circle not shown in FIG. 13), and eight points that are $r\sqrt{5}$ units from the center. Perhaps surprisingly, on a grid point whose nearest neighboring points are r units distant, there are more points that are located $r\sqrt{5}$ units away than r units.

The geometric observations are made using only distance information, so the location of the center peak shown in FIG. 13 is arbitrary and rotations on the grid of points do not have any effect. Thus, the distance histogram itself may be used to efficiently search for the watermark scale without resorting to a search involving the peak coordinates.

The objective is to determine the most likely spacing between grid points. With the distance histogram, we know how often any particular distance occurs between pair-wise peaks. Let q(d) be the bin count of the d-th bin (rounding d to the nearest integer) in the distance histogram, which is equivalently the total number of pair-wise peaks which are d lags/pixels distant in the auto-correlation. The first bin in the distance histogram is indexed by d=0. The value of q(d) is defined to be zero if d indexes a bin larger than the number of bins in the distance histogram. We now define a scoring function by:

$$s(r)=\text{score}(r)=q(r)+q(r\sqrt{2})+q(2r)+q(r\sqrt{5}) \quad (4)$$

And compute the scores over the range of scales to be searched, which produces a scale histogram:

1. for r=1 to max($d_{ij}$) {
2. Calculate s(r) by equation (4) and store s(r) in bin r of the scale histogram
3. }

Once these steps are performed, the tallest peaks in the scale histogram corresponds to the most likely candidates for the distance between the grid points, and hence the watermark scale. The detector sorts the histogram bins in descending order by s(r) and tries each value of r in that order.

Figure 14:
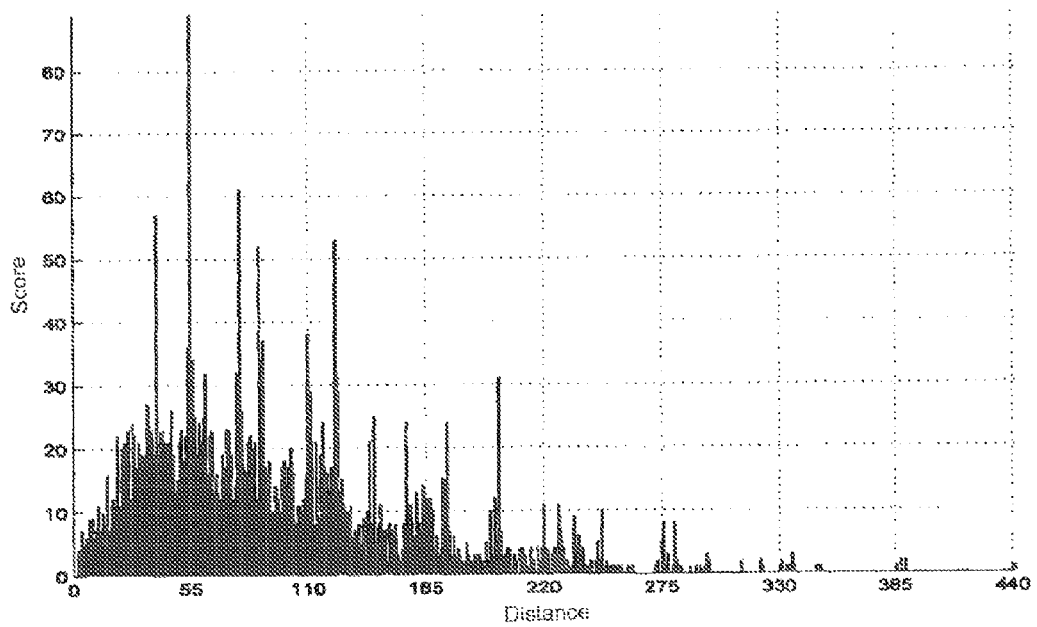
FIG. 14 is a scale histogram of a geometrically distorted image.

FIG. 14 shows the scoring histogram obtained using the procedure above and the distance histogram of FIG. 12. The distances corresponding to the three highest scores are r=55, 78, and 39. In this case, the distance with the highest score corresponds to the correct scale of 55. If 55 was not the proper scale, then the synchronizer would attempt to try 78 next.

Construct Angle Histogram

Similar to scale detection, a histogram of angles between every pair of peaks ($\theta_{ij}$) is constructed. However, due to symmetry, the angle histogram maps all angles to the nearest angle between 0 and 90° by adding or subtracting 90° as needed. The angle histogram has 90 bins, with the first bin corresponding to angles in the range)[0.0,0.5°) and)[89.5, 90.0°), the second bin corresponds to the range[0.5°,1.5°), and so on.

Figure 15:
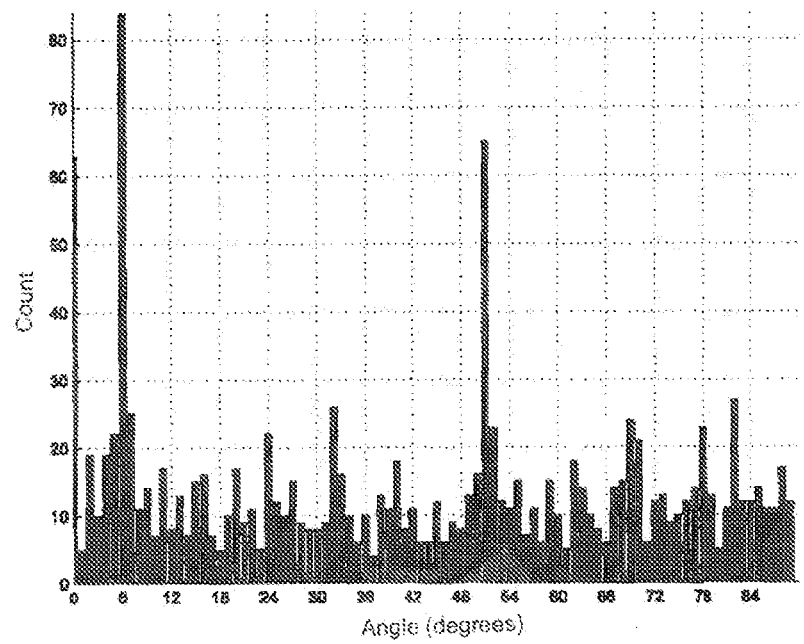
FIG. 15 is an angle histogram of a geometrically distorted image.

FIG. 15 shows the angle histogram of the attacked image, with grid lines corresponding to integral multiples of six degrees. A large peak is observed at the proper rotation angle of six degrees.

Construct Rotation Score Histogram

Figure 16:
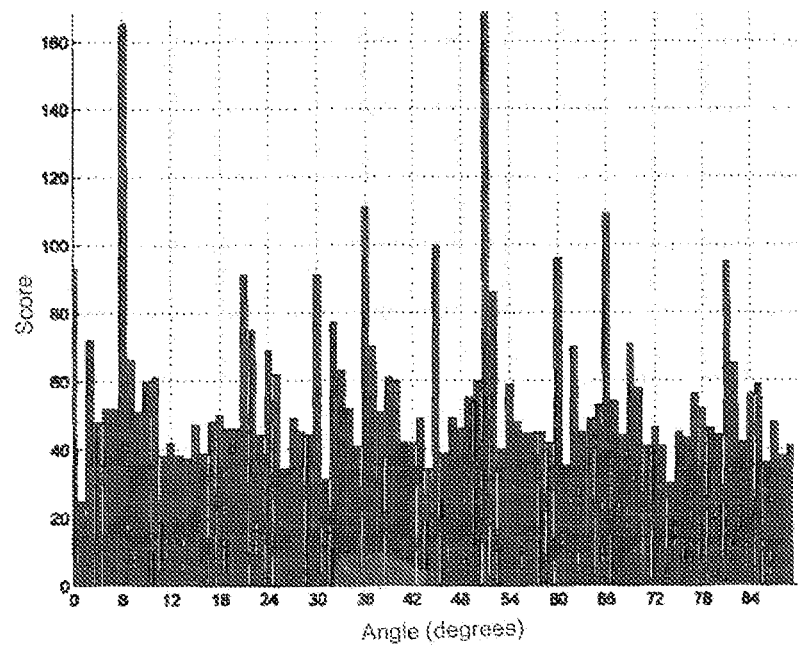
FIG. 16 is a rotation score histogram of a geometrically distorted image.

A geometric argument can be made for constructing a scoring function to estimate the watermark rotation. For estimating the watermark rotation, the scoring function that is currently being considered is:

$$s(\theta)=\text{rotatescore}(\theta)=q(\theta)+q(\theta+30°)+q(\theta+45°)+q(\theta+60°) \quad (5)$$

where q(θ) is defined to be the bin count in the angle histogram corresponding to an angle congruent to θ, rounded the nearest degree in the range [0°,89°]. FIG. 16 shows the rotation score histogram.

This step completes the estimation procedure for the watermark orientation and scale.

Evaluating the Synchronization Procedure

To conduct a study of the synchronization process, we also require a method of evaluating the synchronizer. Alattar et al. use an "Average Detection Error" function as a metric for evaluating a synchronizer in U.S. patent application Ser. No. 10/636,515, which is incorporated by reference. This evaluation metric is roughly the distance between the actual and estimated scale and rotations. The ADE function does, in some sense, measure how "close" the estimated transformation parameters are to the actual transformation parameters but such a metric may not be significant in watermark synchronization. The problem is that it is unclear whether being "close" results in better watermark detection or not. If the estimated parameters are sufficiently close to the actual parameters, then the watermark can be detected even if the estimated parameters are not exactly identical to the actual transformation parameters.

An alternative metric evaluates the synchronizer based on an estimate of how many searches it would require using our scheme to find the watermark scale to the nearest pixel and orientation to the nearest degree. For a test image with known orientation and scale, the synchronization cost is defined to be:

$$\text{synchronization cost}=(\text{cost of estimating scale})\times 4(\text{cost of estimating rotation}) \quad (6)$$

The procedure for estimation of the scale takes the scoring histogram, orders the bins in descending order by score and then tries each candidate scale until the proper scale is found or the synchronizer gives up. Thus, the cost for estimating the scale is the position in which the proper scale appears in the ordered list. If the score for the proper scale in the scale histogram is zero, the detector never tries the proper scale and the synchronization cost is infinity.

For example, if the bin corresponding to the proper scale has the largest score in the scale histogram, then the cost for estimating the scale is 1 because the synchronizer obtains the correct scale on the first try. If the bin corresponding to the proper scale has the second largest score in the scale histogram, then the cost for estimating the scale is 2, and so on.

The cost of estimating the rotation angle is defined similarly on the rotation score histogram. However, the cost for estimating the rotation is quadrupled in the overall cost because we cannot distinguish between rotations of θ, θ+90°, θ+180°, and θ+270° and must generally search all four possibilities. Thus, an estimation error for rotation will cost four searches, whereas an estimation error in the scale incurs a cost of only a single search.

Obviously, the objective is to minimize the expected synchronization cost for any arbitrary watermarked image provided as input to the detector.

CONCLUDING REMARKS

The method described above for spatial synchronization based on peak analysis of the autocorrelation domain may be varied by using different techniques for analyzing the autocorrelation peaks. For example, The detected pattern of peaks in the autocorrelation domain may be matched with an expected pattern using correlation (e.g., see Ser. No. 10/636, 55), Hough transforms, or other pattern recognition methods to detect rotation and scale.

Having described and illustrated the principles of the technology with reference to specific implementations, it will be recognized that the technology can be implemented in many other, different, forms. To provide a comprehensive disclosure without unduly lengthening the specification, applicants incorporate by reference the patent referenced above.

The methods, processes, and systems described above may be implemented in hardware, software or a combination of hardware and software. For example, the auxiliary data encoding processes may be implemented in a programmable computer or a special purpose digital circuit. Similarly, auxiliary data decoding may be implemented in software, firmware, hardware, or combinations of software, firmware and hardware. The methods and processes described above may be implemented in programs executed from a system's memory (a computer readable medium, such as an electronic, optical or magnetic storage device).

The particular combinations of elements and features in the above-detailed embodiments are exemplary only; the interchanging and substitution of these teachings with other teachings in this and the incorporated-by-reference patents/applications are also contemplated.

We claim:

1. A method for synchronization of a host media signal, the method comprising:
   using one or more programmed processors to perform acts of:
   detecting redundant features in a host media signal;
   computing estimates of geometric or temporal distortion of the host media signal from the redundant features;
   synchronizing the host media signal using the estimates of the geometric or temporal distortion of the media signal;
   extracting a feature value from the host media signal;
   computing a watermark signal as a function of the feature value input to a state machine; and
   detecting the watermark signal in the synchronized host media signal.

2. The method of claim 1 wherein the redundant features are detected by computing peaks corresponding to the redundant features, and the geometric or temporal distortion is determined from a histogram of values of the peaks.

3. The method of claim 1 including using a content feature to perform temporal synchronization of the watermark signal.

4. The method of claim 3 including using the content feature to perform temporal synchronization of the watermark signal in frames of video.

5. The method of claim 1 including using a content feature to detect a watermark signal, wherein the content feature comprises statistical features of blocks of the host media signal.

6. The method of claim 5 wherein the statistical features comprise averages of data values in blocks of the host media signal.

7. The method of claim 1 including: using a content feature to identify locations in the host media signal in which to perform watermark detection operations.

8. The method of claim 7 wherein the watermark detection operations comprise a search for a watermark signal.

9. The method of claim 1 wherein the watermark signal is embedded by quantizing features of the host media signal.

10. The method of claim 1 wherein a content feature is input to a function that generates a key to detect the watermark signal.

11. The method of claim 10 wherein the function comprises a state machine.

12. The method of claim 10 wherein the function identifies attributes of the watermark signal that vary over time or space.

13. The method of claim 10 wherein the function provides a pseudorandom map of the watermark signal.

14. The method of claim 1 wherein a key is used to identify temporal locations of a watermark signal, and the watermark signal varies over time according a pseudorandom function.

15. A non-transitory computer readable medium on which is stored instructions, which, when executed by a processor, perform a method comprising:
    detecting redundant features in a host media signal;
    computing estimates of geometric or temporal distortion of the host media signal from the redundant features;
    synchronizing the host media signal using the estimates of the geometric or temporal distortion of the media signal;
    extracting a feature value from the host media signal;
    computing a watermark signal as a function of the feature value input to a state machine; and
    detecting the watermark signal in the synchronized host media signal.

16. The non-transitory computer readable medium of claim 15 on which is stored instructions, which, when executed by a processor, perform a method comprising: using a content feature to perform temporal synchronization of the watermark signal.

17. The non-transitory computer readable medium of claim 16 on which is stored instructions, which, when executed by a processor, perform a method comprising: using the content feature to perform temporal synchronization of the watermark signal in frames of video.

18. The non-transitory computer readable medium of claim 15 on which is stored instructions, which, when executed by a processor, perform a method comprising: using a content feature to detect a watermark signal, wherein the content feature comprises statistical features of blocks of the host media signal.

19. The non-transitory computer readable medium of claim 18 wherein the statistical features comprise averages of data values in blocks of the host media signal.

20. The non-transitory computer readable medium of claim 15 on which is stored instructions, which, when executed by a processor, perform a method comprising: using a content feature to identify locations in the host media signal in which to perform watermark detection operations.

21. The non-transitory computer readable medium of claim 20 wherein the watermark detection operations comprise a search for a watermark signal.

22. The non-transitory computer readable medium of claim 15 wherein the watermark signal is embedded by quantizing features of the host media signal.

23. The non-transitory computer readable medium of claim 15 wherein a content feature is input to a function that generates a key to detect the watermark signal.

24. The non-transitory computer readable medium of claim 23 wherein the function comprises a state machine.

25. The non-transitory computer readable medium of claim 23 wherein the function identifies attributes of the watermark signal that vary over time or space.

26. The non-transitory computer readable medium of claim 23 wherein the function provides a pseudorandom map of the watermark signal.

27. The non-transitory computer readable medium of claim 15 wherein a key is used to identify temporal locations of a watermark signal, and the watermark signal varies over time according a pseudorandom function.

* * * * *